Dec. 3, 1968  J. E. HASSERT ETAL  3,414,460
REINFORCED STRUCTURAL PRODUCT AND METHOD FOR MAKING SAME
Filed May 17, 1965

THIN LAYER REMOVED
ELIMINATING THE OXIDATION

INVENTORS
JAMES E. HASSERT
ELIAS D. HONTZ
BY Cushman, Darby & Cushman
ATTORNEYS

United States Patent Office

3,414,460
Patented Dec. 3, 1968

3,414,460
REINFORCED STRUCTURAL PRODUCT AND METHOD FOR MAKING SAME
James E. Hassert and Elias D. Hontz, Wilmington, Del., assignors to Haveg Industries, Inc., Wilmington, Del., a corporation of Delaware
Filed May 17, 1965, Ser. No. 456,389
23 Claims. (Cl. 161—143)

ABSTRACT OF THE DISCLOSURE

A reinforced structural product is prepared by (1) removing the oxidized surface of a base, e.g. a tube, made of a mixture of oxidizable thermosetting synthetic resin and a high-temperature resistant inorganic material which is either siliceous, e.g. asbestos, or carbon, e.g. graphite or coke, and (2) then filament winding around the surface a layer of glass fiber impregnated with a polyester resin or an epoxy resin.

---

This invention relates to a novel reinforced resinous material and to a method of making the same.

There are many instances when a strong reinforced material is needed which will withstand extremely high temperatures and corrosive conditions, and still have high impact strength.

It is, therefore, an object of the present invention to provide a structural material which will withstand extremely high temperatures.

It is another object to provide a structural material which will be resistant to alkaline and acid attacks.

A further object is to provide a structural material which has high tensile and compressive strength and which is resistant to outside impacts.

Still other objects will become apparent from the following description and the appended claims.

It has now been found that these objects can be achieved by armoring a base material, made from a mixture of a thermosetting synthetic resin susceptible to oxidation and high temperature-resistant inorganic material, with a layer of glass fiber impregnated with an epoxy resin or polyester resin. The oxidized layer of the resin is removed prior to applying the impregnated glass fibers.

As stated above, the base material of the present invention is a mixture of a thermosetting synthetic resin and a high temperature-resistant inorganic material. The inorganic material can be asbestos of a wide variety of types, ranging from long fiber chrysotile to short fiber amphibole types. The latter types include anthophyllite, amosite, etc. The presently preferred form of asbestos is the anthophyllite variety which has been treated to eliminate acid soluble metallic constituents, and this form of asbestos was used in the specific examples.

The anthophyllite asbestos can be treated to eliminate acid solubles in the following manner:

500 pounds of the asbestos fiber are loaded into a closed reactor equipped with an agitator. The asbestos is covered with a solution of 20% hydrochloric acid which is brought to boiling and the mixture is maintained at reflux for 2 hours with gentle agitation.

The extracted asbestos mixture is then poured onto a glass filter cloth and the liquid removed with the aid of a vacuum in conventional fashion. The asbestos is then washed thoroughly with water and dried in either a tray drier or a rotary drier. The dried product is then ready for mixing with the resin. This is an additional advantage of the present type of materials.

Other inorganic fillers which can be used include graphite, coke flour, mica, talc, silica flour, silica fibers, glass fibers, etc.

The preferred thermosetting resins are phenolic resins and furane resins. Among the preferred resins there can be mentioned Haveg 41 (phenol-formaldehyde resin), Haveg 451 (a cashew nut shell liquor modified phenol-formaldehyde resins containing 22% cashew nut shell liquor), or Haveg 61 (a furfuryl alcohol-formaldehyde resin 85:15). Other phenolic and furane resins can also be used, e.g., phenol-furfural, cresylic acid-formaldehyde, m-cresol-formaldehyde, furfuryl alcohol resins, furfuryl alcohol-formaldehyde resin (80:20), furfuryl alcohol-furfural resin (85:15), xylenol formaldehyde, e.g., 3,5-dimethylxylenol-formaldehyde, as well as mixed xylenol formaldehyde resins, resorcinol-formaldehyde, etc.

The preferred thermosetting resins are phenol-formaldehyde resins and furane resins. In the examples, a one-stage, alkali catalyzed phenol-formaldehyde resin was employed unless otherwise indicated, but there can also be used two-stage phenol-formaldehyde condensates wherein a novolak, for example, is cured to the finished state by addition of a catalyst or curing agent such as a formaldehyde source, e.g., paraformaldehyde, hexamethylenetetramine or trioxane. For example, to a novolak made from 1 mol of phenol and 0.83 mol of formaldehyde there can be added 15% by weight of the novolak of hexamethylenetetramine as a curing agent.

In the base material of the present invention, the asbestos fiber or other inorganic filler can be present in an amount from 35% to 65% and the thermosetting resin in an amount from 65% to 35%. Preferably the asbestos fiber is present in an amount from 55% to 45% and the thermosetting resin in an amount from 45% to 55%. When the base material of the present invention is used in contact with fluorides, the asbestos fiber may be replaced by carbon in the form of graphite and/or coke flour. The graphite and/or coke flour can be present in the same amount as specified for the asbestos fiber.

In the specification and claims, unless otherwise stated, all percentages and parts are by weight.

The glass fiber employed in the present invention, which is impregnated with the epoxy resin, are strands each composed of a multitude of fine glass filaments which are formed by being drawn at a high rate of speed from molten glass. The glass fiber may be coated, if desired, with any of the well-known coupling agents or sizes.

The epoxy resins which can be used include the epoxy ether resins having a 1,2-epoxy equivalency of greater than 1, such as the reaction products of polyhydric alcohols or polyhydric phenols with epichlorhydrin or glycerol chlorhydrin. Examples of such resins are the polyglycidyl ethers of resorcinol, catechol, hydroquinone, bis-(4-hydroxyphenyl)-2,2-propane (bis-phenol A), 4,4'-dihydroxy-benzophenone, bis-(4-hydroxyphenyl) - 1,1 - ethane, tetrakis-(4-hydroxyphenyl)ethane, bis - (4 - hydroxyphenyl)-1,1-isobutane, bis-(4-hydroxyphenyl)-2,2-butane, bis-(4-hydroxy-2-methyl-phenyl)-2,2-propane, bis-(4 - hydroxy-2-t-butyl-phenyl) - 2,2 - propane, bis - (2 - hydroxynaphthyl)-methane, 1,5 - dihydroxynaphthalene, ethylene glycol, propylene glycol, trimethylene glycol, diethylene glycol, triethylene glycol, glycerol, dipropylene glycol, diglycerol, erythritol, mannitol, sorbitol, polyallyl alcohol, polyvinyl alcohol, novolak resins, e.g., the novolak from 4 moles of phenol and 3 moles of formaldehyde, as well as other novolaks having 3 to 7 phenolic nuclei, phloroglucinol, 2,4,4'-trihydroxy diphenyl dimethyl methane, 4,4'-dihydroxy diphenyl sulfone, 4,4'-dihydroxy biphenyl, polymeric butadiene dioxide, diglycidyl ether, allyl glycidyl ether, glycidyl methacrylate, glycidyl ester or trimerized linoleic acid, diglycidyl ester of dimerized linoleic acid. Oxiron 2000 (an epoxidized polybutadiene) partially hydrolyzed vinyl acetate copolymer having a viscosity of 1800 poise, an epoxy equivalency of 177, having 25% hydroxyl and an iodine number of 185 can also be used. The preferred epoxy resins are low molecular weight bis-phenol A-epichlorhydrin resins.

Polyester resins can be used in place of the epoxy resins. These polyester resins contain two major components, a linear unsaturated polyester and a polymerizable vinyl (or vinylidene) monomer which dissolves in the polyester and is subsequently polymerized along with the completion of the cure of the polyester. The polyester can be made from glycols such as ethylene glycol, diethylene glycol, propylene glycol, dipropylene glycol, 2,3-butanediol, 1,3-butanediol, trimethylene glycol and unsaturated dibasic acids such as maleic acid, fumaric acid, cis-3,6-endomethylene-$\Delta^4$-tetrahydrophthalic acid, hexachlorendomethylene tetrahydrophthalic acid, itaconic acid, citraconic acid, etc. A portion of the unsaturated acid can be replaced by saturated aliphatic or aromatic dibasic acids such as succinic acid, adipic acid, azelaic acid, sebasic acid, phthalic acid, terephthalic acid, isophthalic acid and tetrachlorophthalic acid. As the vinyl or vinylidene monomer component, there can be used styrene, the vinyl toluenes, e.g., o-vinyl toluene, alpha-methyl styrene, triallyl cyanurate, diallyl phthalate, methyl methacrylate, vinyl acetate, o-chlorostyrene, o-fluorostyrene, 3,5-dichlorostyrene. A typical example of such a polyester resin is a styrene modified condensation product of propylene glycol with a mixture of phthalic anhydride and maleic anhydride.

The epoxy resins employed in the present invention can be cured with any of the epoxy curing agents. For this purpose, there may be used small amounts of poly-functional amines, such as ethylene diamine, ethylene triamine, benzyl dimethylamine, 3-dimethylaminopropylamine, 3-diethylaminopropylamine, tetraethylene pentamine and the like.

Additional curing agents include N-hydroxyethyl diethylenetriamine, tri(dimethylaminomethyl)phenol, m-phenylene-diamine, dicyandiamide, melamine, triethylene tetramine, piperazine, diacetone diamine, 4,4'-diaminodiphenyl sulfone, sodium hydroxide, potassium hydroxide, sodium phenoxide, acid materials preferably having a plurality of acid groups, e.g., oxalic acid, phthalic anhydride, citric acid, tricarbyllic acid, aconitic acid, itaconic acid, malic acid, diglycollic acid, phosphoric acid, n-butyl dihydrogen phosphate, diethyl ortho phosphate, hexaethyl tetraphosphate, Friedel-Crafts metal halides, e.g., aluminum chloride, zinc chloride, ferric chloride, boron trifluoride, boron-fluoride-diethyl ether complex, boron-fluoride-phenol complex, diisocyanates, e.g., 2,4-toluene diisocyanate, and polyamides, e.g., long chain fatty acid amides such as Versamid 115 and Versamid 125.

Amines and amides having at least 5 carbon atoms are often especially effective.

The curing agents may be used in various amounts, although they are usually employed in the range of from 0.05 to 0.25 part per part by weight of epoxy ether resin. The preferred epoxy resins may be set into a cured state simply by the addition thereto of the curing agent at ambient temperatures, e.g., 10 to 60° C., and, hence, these two ingredients are usually kept separated until just before impregnation of the epoxy resin onto the glass fibers for immediate winding on the structural shape to be armored.

In the epoxy-glass layer of the present invention, the epoxy resin is usually present in an amount from 25% to 45% and the glass fiber in an amount from 75% to 55%. Preferably the epoxy resin is present in an amount from 30% to 35% and the glass fiber in an amount from 70% to 65%.

Figure 1:
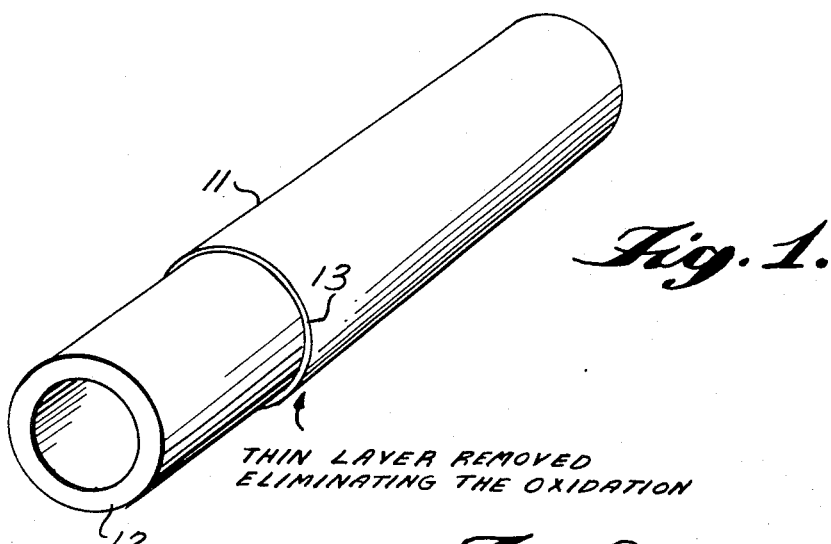
FIGURE 1 shows a perspective view of a tube made from the base material of the present invention.
Figure 2:
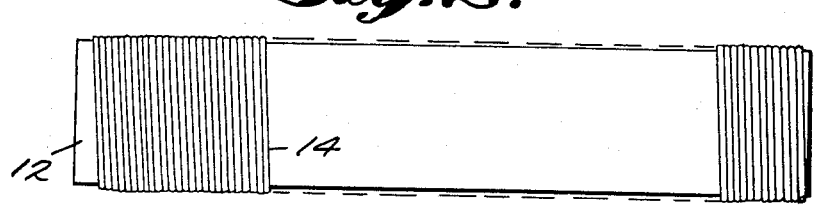
FIGURE 2 is an elevation view showing the tube of FIGURE 1 partially covered with the epoxy-glass system of the present invention.
Figure 3:
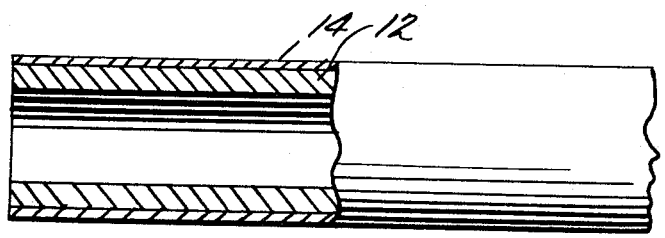
FIGURE 3 is an elevation view partly in section showing a tube made in accordance with the present invention.

Referring more specifically to the drawings, a structural shape such as the tube 11 is made from the base material of the present invention, e.g. asbestos filled phenol-formaldehyde resin. After the base material is formed into the tube, it is cured. The cured tube consists of two parts: an inner layer of cured base material 12 and an outer layer, usually thin, of oxidized base material 13. The oxidized layer 13 is then completely removed and the resultant tube is filament wound with a glass fiber 14 impregnated with an epoxy resin or polyester resin. The oxidized layer can be removed by turning or shaving in a lathe, grinding or sand blasting, for example. This armored tube is then cured to produce the desired product.

The armored structure, after curing, may then be machined for addition of nozzles, branches, lugs, or other fittings using a glass cloth-epoxy resin "flashing" construction at the joint on the glass side, and a Haveg (phenol-formaldehyde resin-asbestos) cement on the phenolic side. This entire assembly is then recured.

Figure 4:
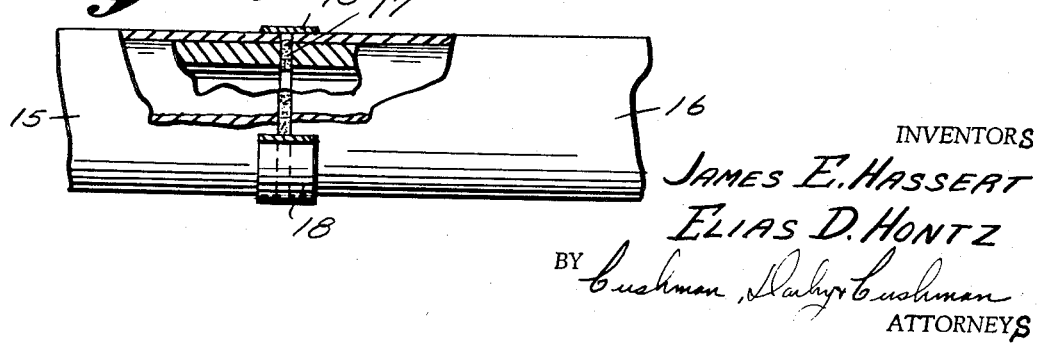
FIGURE 4 is an elevation view partly in section showing two tubes made in accordance with the present invention joined together.

In FIGURE 4 two armored tubes 15 and 16 are shown joined together to form one continuous pipe. The ends of tubes 15 and 16 are brought into close proximity and the space between them is then filled with a Haveg cement 17 which has essentially the same composition as the base material of the present invention. This Haveg cement is then cured and the outside circumference of this joint is then covered with a glass cloth 18 which is impregnated with an epoxy resin. When the epoxy resin on the glass cloth is cured, the tubes 15 and 16 are strongly joined together. The epoxy resin can be a bis-phenol A-epichlorhydrin resin, for example.

To make the inside surface of tube 11 resistant to wear and abrasion, the asbestos fibers in the base material are preferably oriented circumferentially of the tube.

To obtain a true armoring effect, there must be a good bond between the epoxy-glass layer and the absestos-resin layer. This intimate bonding can be achieved only if the oxidized surface of the cured asbestos-resin material is thoroughly removed. The removal operation can be performed on a lathe, by grinding or sand blasting.

In Examples 1 and 2 are given typical examples of preparing the thermosetting resins which can be employed in the present invention.

Example 1

104 lbs. of phenol and 109 lbs. of 37% aqueous formaldehyde were placed in a vessel. This mixture was heated by steam until the temperature reached 100° F., 20 lbs. of water were added to the vessel and heating continued and when the temperature reached 150° F., a mixture of 790 grams sodium hydroxide and 4000 cc. of water were added. The mixture was heated slowly until the reaction started at about 175° F. Then the steam was turned off until the reaction became less violent. The temperature was then maintained between 200° F. and and 215° F. for 90 minutes after refluxing began. The steam pressure was not allowed to exceed 3 lbs./sq. in. (gauge). At the end of the 90 minute period, the steam was released and cooling water turned on. The temperature was allowed to drop to about 140° F. before starting the distillation. The vacuum was maintained between 20 and 30 inches. The temperature was brought to 125° F. at 28.5 inches of vacuum and the water distilled off. Distillation was continued for 20 minutes. In all, about 7.2 gallons of water were distilled off. Then the vacuum was turned off and air admitted to the kettle.

Example 2

1500 grams of furfuryl alcohol, 750 grams of 37% aqueous formaldehyde and 12 cc. of dilute phosphoric acid (1 vol. 85% H₃PO₄ to 2 vol. of water) were mixed together and the system heated with a water condenser attached at 86 to 98.5° C. for 90 minutes. The resin was then partially neutralized to a pH of 4 to 5 with aqueous sodium hydroxide, cooled at 70° C. and dehydrated in vacuo. The yield was 1674 grams of dark viscous resin. This resin was soluble in ethyl acetate. It was rapidly thermoset with heat and strong organic acids. Thus, 1% maleic acid or maleic acid at 250 to 300° F. was a good catalyst for curing the liquid resin.

The presently preferred resins are phenol-formaldehyde resins. The resins can be either liquid or solid, but preferably are liquid resins having solids contents of 50 to 95%.

Example 3

A tube was formed from a mixture of 48% of a phenol-formaldehyde resin having a viscosity of 50,000 centpoises (prepared as described in Example 1) and 52% of the anthophyllite variety of amphibole asbestos which had been previously treated with strong, hot hydrochloric acid to remove essentially all the acid solubles in the manner previously described.

This mixture of phenol-formaldehyde resin and asbestos was a plastic mass which was then applied to the outside of a steel tube or mandrel in a manner to insure that the orientation of the asbestos fibers was essentially circumferential. The mandrel had an outside diameter of 1.875 inches and the plastic was applied to the mandrel outer surface by dropping the plastic mixture thereon in contact with a longitudinally travelling roller while the mandrel was rotated or spun at a speed of 100 r.p.m. until the plastic was built up to a depth of 0.375 inch. In this way, the asbestos fibers were oriented circumferentially of the mandrel.

The resultant formed plastic with its mandrel was heated in an autoclave to complete the polymerization at a pressure of 110 p.s.i. gauge. The temperature was raised over a period of about an hour to 275° F. The preheat temperature was maintained at 275° F. for a little over an hour and then was reduced to 240° F. over 15 minutes, during the subsequent period while the exotherm was occurring within the piece. Following the subsidence of the exotherm, the temperature was raised at an orderly rate to the curing level of 275° F. The period of reduced temperature and gradual rise took about 5½ hours. Curing was then completed at 275° F. for 4 hours. The pressure was released and the mandrel was then withdrawn from the solid, cured tubular object.

Example 4

The oxidized layer on the outside of the tube made in accordance with Example 3 was removed by turning on a lathe. The cured but non-oxidized tube surface was then filament wound with a glass fiber impregnated with Epon 828. Epon 828 is a liquid bis-phenol A-epichlorhydrin resin having an epoxide equivalent of 175–210, a molecular weight of 350–400 and a viscosity (Gardner-Holdt) at 25° C. of 5,000–15,000 measured in 40% butyl Carbitol. The impregnated glass contained 67% glass fiber, 30% Epon 828 and 3% diethylene triamine catalyst. This glass-Epon mixture was allowed to cure at room temperature and within 24 hours it became set into a tough, continuous layer. The resultant tube was then finished at a temperature of 225–250° F., for 2 hours. This product had excellent impact strength as well as ability to withstand high temperatures and corrosive conditions. An excellent bond between the phenolic and epoxy resin layers was obtained. The shear bond strength of this tube is approximately 2 to 3 times as great as tubes similarly made but without having the oxidized layer of phenol-formaldehyde resin and asbestos shaved off.

Example 5

Two armored tubes made in accordance with Example 4 were joined together to form one continuous tube as follows:

The two tubes were placed end to end, leaving a small space between them for the cement. The cement used was the mixture of phenol-formaldehyde resin and asbestos described in Example 3. The outside surface of this joint was wrapped in a glass cloth impregnated with the Epon 828 of Example 4. This assembly was then cured in an autoclave at 250° F. and 120 p.s.i.g. for about 2 hours. The resulting tube had excellent strength and was resistant to corrosive conditions such as high temperatures and acid or alkaline attacks.

Example 6

Example 3 was repeated except that the tube was made from a mixture of 42% of the phenol-formaldehyde prepared in Example 1, 40% anthophyllite asbestos and 18% silica flour.

Example 7

Example 3 was repeated except that the anthophyllite asbestos in the mixture was replaced by graphite.

Example 8

The tubes made in accordance with Examples 6 and 7 were shaved, filament wound and cured as in Example 4. The resulting products were similar in characteristics to the product of Example 4. Furthermore, the product containing graphite was found to be suitable for use in handling chemicals containing fluorides.

The invention has been described in detail with reference to the preferred embodiment thereof, but it will be understood that variations and modifications can be made within the spirit and scope of the invention.

What is claimed is:
1. A reinforced structural product comprising:
   a base made of a mixture of oxidizable thermo-setting synthetic resin and a high-temperature resistant inorganic material selected from the class consisting of siliceous materials and carbon,
   and a layer of glass fiber impregnated with a member of the class consisting of polyester resins and epoxy resins on said base,
   said structure being characterized by freedom from oxidized synthetic resin at the interface of the base and said glass fiber layer.
2. A product according to claim 1 wherein the inorganic material is carbon in the form of coke.
3. A product according to claim 1 wherein the inorganic material is carbon in the form of graphite.
4. A product according to claim 1 wherein the inorganic material is asbestos.
5. A product according to claim 4 wherein the asbestos is anthophyllite asbestos.
6. A product according to claim 4 wherein the oxidizable thermosetting synthetic resin is a cashew nut shell liquor modified phenol-formaldehyde resin.
7. A product according to claim 1 wherein the oxidizable thermosetting synthetic resin is a phenol-formaldehyde resin.
8. A product according to claim 7 wherein the inorganic material is asbestos.
9. A product according to claim 7 wherein the inorganic material is silica.
10. A product according to claim 7 wherein the inorganic material is carbon.
11. A product according to claim 7 wherein the glass fiber is impregnated with an epoxy resin.
12. A product according to claim 7 wherein the glass fiber is impregnated with a bis-phenol A-epichlorhydrin resin.
13. A product according to claim 1 wherein the oxidizable thermosetting synthetic resin is a furfuryl alcohol-formaldehyde resin.
14. A product according to claim 13 wherein the inorganic material is asbestos.

15. A reinforced structural product comprising:

a base made of (1) 35% to 65% anthophyllite asbestos and (2) 65% to 35% of an oxidizable thermosetting synthetic resin selected from the class consisting of phenol-formaldehyde resins and furane resins, and a layer of impregnated glass fiber containing 25% to 45% epoxy resin, said structure being characterized by freedom from oxidized synthetic resin at the interface of the base and said glass fiber layer.

16. A reinforced structural product comprising:

a base made of (1) 35% to 65% carbon and (2) 65% to 35% of a cashew nut shell liquor modified phenol-formaldehyde resin, and a layer of impregnated glass fiber containing 25% to 45% epoxy resin, said structure being characterized by freedom from oxidized synthetic resin at the interface of the base and said glass fiber layer.

17. A process for preparing a reinforced structural shape comprising:

mixing a high-temperature resistant inorganic material selected from the class consisting of siliceous materials and carbon with an oxidizing thermosetting synthetic resin, forming said mixture into said shape, curing said shaped mixture, removing the oxidized layer from the surface of said shaped mixture, filament winding glass fiber on to said shaped mixture, said glass fiber being impregnated with a member selected from the class consisting of polyester resins and epoxy resins, and curing said impregnated glass fiber.

18. The process of claim 17 wherein said oxidizable thermosetting synthetic resin is a phenol-formaldehyde resin.

19. The process of claim 17 wherein said inorganic material is asbestos.

20. The process of claim 17 wherein said oxidizable thermosetting synthetic resin is a furfuryl alcohol-formaldehyde resin.

21. The process of claim 20 wherein said inorganic material is asbestos.

22. The process of claim 17 wherein said glass fiber is impregnated with an epoxy resin and said oxidizable thermosetting synthetic resin is a member selected from the class consisting of phenol-formaldehyde resins and furane resins.

23. The process of claim 22 wherein said oxidizable thermosetting synthetic resin is a cashew nut shell liquor modified phenol-formaldehyde resin.

References Cited

UNITED STATES PATENTS

| | | | |
|---|---|---|---|
| 1,960,180 | 5/1934 | Cunningham | 161—205 |
| 2,049,878 | 8/1936 | Stresino | 161—205 |
| 2,267,817 | 12/1941 | Costa | 161—205 X |
| 2,718,483 | 9/1955 | Clark | 161—205 X |
| 3,321,101 | 5/1967 | Griffith | 161—185 X |

HAROLD ANSHER, *Primary Examiner.*